(12) United States Patent
Hisatomi et al.

(10) Patent No.: US 7,379,199 B2
(45) Date of Patent: May 27, 2008

(54) PRINT CONTROLLING APPARATUS AND PRINT CONTROLLING METHOD

(75) Inventors: Kenji Hisatomi, Hirakata (JP); Kazuyuki Murata, Kyotanabe (JP); Jun'ichi Kubota, Amagasaki (JP); Kaoru Murase, Nara (JP); Yukio Yagi, Ikoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 567 days.

(21) Appl. No.: 10/503,083

(22) PCT Filed: Mar. 31, 2003

(86) PCT No.: PCT/JP03/04061

§ 371 (c)(1),
(2), (4) Date: Jul. 30, 2004

(87) PCT Pub. No.: WO03/084222

PCT Pub. Date: Oct. 9, 2003

(65) Prior Publication Data
US 2005/0078334 A1 Apr. 14, 2005

(30) Foreign Application Priority Data
Apr. 2, 2002 (JP) .............................. 2002-099979

(51) Int. Cl.
*G06F 3/12* (2006.01)

(52) U.S. Cl. ...................... 358/1.15; 348/460; 380/210; 705/52

(58) Field of Classification Search ............... 358/1.15; 382/100; 380/210, 228; 348/460; 705/52
See application file for complete search history.

(56) References Cited

U.S. PATENT DOCUMENTS

| 5,325,431 | A | * | 6/1994 | Naruse | 380/228 |
| 5,818,935 | A | * | 10/1998 | Maa | 380/200 |
| 5,825,876 | A | * | 10/1998 | Peterson, Jr. | 705/52 |
| 6,600,571 | B1 | * | 7/2003 | Ito | 358/1.15 |
| 7,171,021 | B2 | * | 1/2007 | Yoshida et al. | 382/100 |
| 2001/0027557 | A1 | * | 10/2001 | Shinkawa et al. | 725/1 |
| 2001/0028408 | A1 | * | 10/2001 | Arima | 348/460 |
| 2002/0047905 | A1 | * | 4/2002 | Kinjo | 348/207 |
| 2002/0078445 | A1 | * | 6/2002 | Sharif et al. | 725/37 |
| 2003/0164973 | A1 | | 9/2003 | Hisatomi et al. | |

FOREIGN PATENT DOCUMENTS

EP 1 085 740 3/2001

(Continued)

OTHER PUBLICATIONS

Machine translation of JP 2000156781 A. See page 8.*

*Primary Examiner*—King Y. Poon
*Assistant Examiner*—Nathan K Tyler
(74) *Attorney, Agent, or Firm*—Wenderoth, Lind & Ponack, L.L.P.

(57) ABSTRACT

This invention relates to a producer of content who associates information for print control with the content such as a picture, before delivery. Specifically, a digital broadcast receiving device receives this content delivery, and the content is decoded by a data decoding unit via a broadcast receiving unit. A controlling unit judges print control information registered in association with the decoded content, performs image processing in accordance with this print control information, and transmits data for printing to a printing device. The printing device performs printing according to the received data for printing.

28 Claims, 19 Drawing Sheets

FOREIGN PATENT DOCUMENTS

| | | |
|---|---|---|
| EP | 1 133 170 | 9/2001 |
| EP | 1 182 883 | 2/2002 |
| JP | 11-146378 | 5/1999 |
| JP | 2000156781 A * | 6/2000 |
| JP | 2001-36833 | 2/2001 |
| JP | 2001-54082 | 2/2001 |
| JP | 2001-86452 | 3/2001 |
| JP | 2001-086452 | 3/2001 |
| JP | 2001-136136 | 5/2001 |
| JP | 2001-145049 | 5/2001 |
| JP | 2001-186449 | 7/2001 |
| JP | 2001-223997 | 8/2001 |
| JP | 2001-237783 | 8/2001 |
| JP | 2001-320637 | 11/2001 |
| JP | 2002-77799 | 3/2002 |
| JP | 2002-94917 | 3/2002 |
| JP | 2003-37812 | 2/2003 |

\* cited by examiner

| PRINT CONTROL INFORMATION | PRINT CONDITION |
|---|---|
| 0 | FREELY PRINTABLE |
| 1 | PRINTABLE FOR ONCE |
| 2 | PRINTABLE AT LOW RESOLUTION |
| 3 | NO PRINTING |

FIG. 8A
top_page.bml
```
<?xml version="1.0" encoding=:EUC-JP"?>
<?bml="1.0"?>
<bml>
<head>
   <print_ctrl copy="never"></print_ctrl>
</head>
<body>
<p>
From here, you can read the main body of news.
After this, pictures will follow.
</p>
<img src="1.jpg"/>
<img src="2.jpg"/>
</body>
</bml>
```
1.jpg
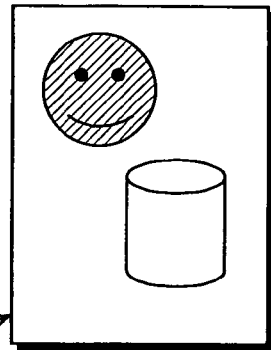
2.jpg
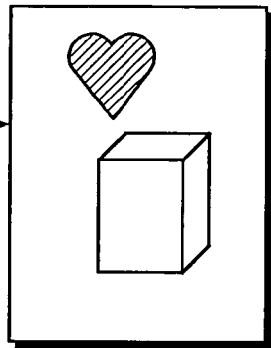
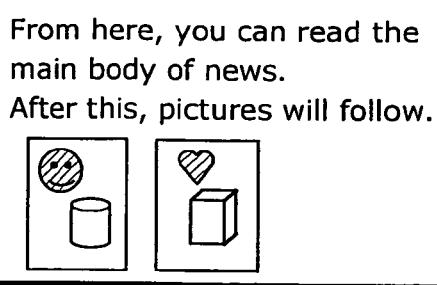
FIG. 8B
SCREEN DISPLAY
FIG. 8C
PRINTING RESULT
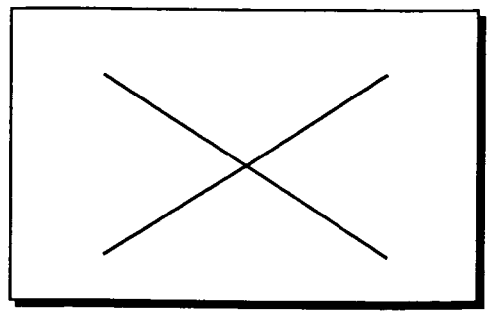

FIG. 9A top_page.bml

```
<?xml version="1.0" encoding=:EUC-JP"?>
<?bml="1.0"?>
<bml>
<head>
  <print_ctrl content="image/jpeg" copy="never">
</print_ctrl>
</head>
<body>
<p>
From here, you can read the main body of news.
After this, pictures will follow.
</p>

<img src="1.jpg"/>

<img src="2.jpg"/>

</body>
</bml>
```

1.jpg
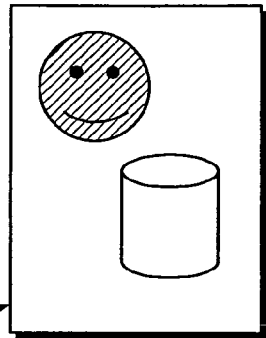

2.jpg
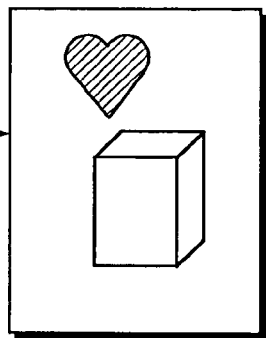

FIG. 9B
SCREEN DISPLAY

From here, you can read the main body of news.
After this, pictures will follow.

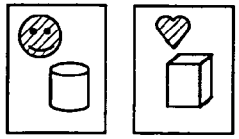

FIG. 9C
PRINTING RESULT

From here, you can read the main body of news.
After this, pictures will follow.

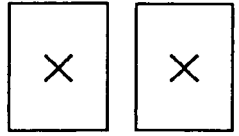

top_page.bml

```
<?xml version="1.0" encoding=:EUC-JP"?>
<?bml="1.0"?>
<bml>
<body>
<p>
From here, you can read the main body of news.
After this, pictures will follow.
</p>

<print_ctrl copy="never">
<img src="1.jpg"/>
</print_ctrl>

<print_ctrl copy="ok">
<img src="2.jpg"/>
</print_ctrl>

</body>
</bml>
```

SCREEN DISPLAY

PRINTING RESULT

←Operation button of the BML browser is set to grayout, making print operation impossible.

SCREEN DISPLAY

FIG. 12A top_page.bml

```
<?xml version="1.0" encoding=:EUC-JP"?>
<?bml="1.0"?>
<bml>
<body>
<p>
From here, you can read the main body of news.
After this, pictures will follow.
</p>

<print_ctrl copy="never">
<img src="1.jpg"/>
</print_ctrl>

<print_ctrl copy="ok">
<img src="2.jpg"/>
</print_ctrl>

</body>
</bml>
```

1.jpg
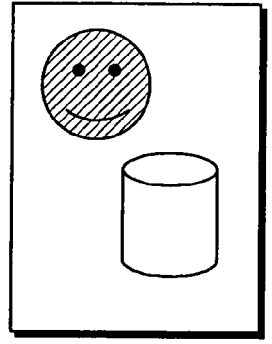

2.jpg
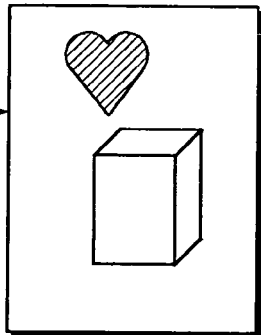

FIG. 12B

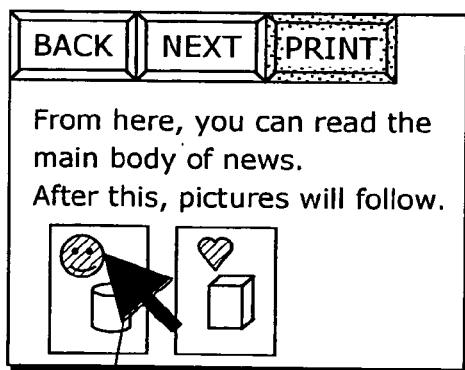

← Operation button of BML browser

SCREEN DISPLAY

When the cursor is put on 1.jpg, the print button is set to grayout.

FIG. 12C

PRINTING RESULT
Only 2.jpg can be printed out.

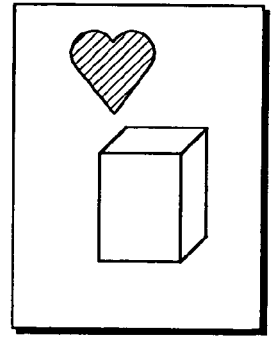

FIG. 15

| INDIVIDUAL PRINT PERMISSION INFORMATION | PRINT CONDITION |
|---|---|
| 0 | FREELY PRINTABLE |
| 1 | PRINTABLE AT HIGH RESOLUTION |
| 2 | Pay Per Print POSSIBLE |
| 3 | PRINTABLE FOR ONCE |

PRINT CONTROLLING APPARATUS AND PRINT CONTROLLING METHOD

BACKGROUND OF THE INVENTION

1. Field of the Invention

The present invention relates to a print control technology that is used when a viewer prints out a picture or the like from a digital broadcast. Specifically, the present invention relates to a technology that is used principally by a provider broadcasting content for the above-mentioned print control.

2. Description of the Related Art

In recent years, due to the launching of full-scale digital broadcasts which included an abundant variety of content and information, printers from which pictures or the like can be printed out from the digital broadcast have been suggested. Moreover, a model that is capable of printing a high-definition picture just the way it is displayed on a high-quality television has come along. Practically, copyright management cannot be achieved in this situation for a provider of broadcast content that tries to exercise copyright to recover a part of the cost that was required to create the broadcasted content.

One of the measures to prevent such copyright infringement from happening is disclosed in Japanese Laid-Open Patent No. 2001-086452 titled "System for printing out still picture, method for printing out still picture, and information providing medium." Using the invention of the above-mentioned reference, the provider of the broadcast content principally limits and controls picture printing performed by the viewer, by setting "a print permission flag" in header information of a TS packet defined according to the MPEG system.

However, in the case of the above-mentioned conventional method, a subject to be controlled by the print permission flag is only picture data and, in addition, it is controlled on a displayed whole-screen basis. For this reason, it is impossible to cover transmitted data contents other than pictures that are attached to digital broadcast, and to limit print performance to only one frame out of multi-channel display or to only pictures out of a mixed display of pictures and text. Especially when one screen includes both a part that needs to be limited for printing and a part that does not need to be limited for printing, print limitation should be placed on the whole screen. Such a feature would cause complaints to both the provider's side of the content and the viewer's side.

To solve the stated problem, it is an object of the present invention to provide a print controlling apparatus that allows print limitations to be placed on a part of a plurality of contents displayed on one screen.

Moreover, it is a second object to provide a print controlling apparatus that allows print limitation to be placed on data contents interlocking with main track video.

SUMMARY OF THE INVENTION

To achieve the stated object of the invention, the print controlling apparatus of the present invention is a print controlling apparatus that is connected to a printing device and that is provided with a receiving unit operable to receive a broadcast signal including print control information and a content file storing a content, a print instruction obtaining unit operable to obtain a print instruction to print at least a part of a received content file, and an outputting unit operable to output a subject of printing that has been instructed to print to the printing device when the print instruction is obtained and the print control information satisfies a predetermined condition.

Moreover, the print controlling apparatus may be further connected to a displaying device, wherein the broadcast signal may further include a content control file that stores information regarding content, and wherein the print controlling apparatus may be further include a display controlling unit operable to output a signal displaying the content to the displaying device on the basis of the content control file included in the broadcast signal received by the receiving unit.

With this, the output for printing the contents is controlled, depending on the details indicated by the print control information included in the digital broadcast signal. Thus, it becomes possible to control the output for printing of the various contents included in the digital broadcast signal. Thus, the print output control reflecting the intentions of a content producer and a content sender becomes possible.

Here, the print control information may be associated with the content file. On account of this, the print limitation becomes possible in units of files, and the print limitation can be placed on a partial content on the screen when one display is formed by a plurality of files.

Also, the broadcast signal may further include picture data, and the print control information may be associated with a program that is formed by a pair of the content control file and the content file. Accordingly, the print limitation becomes possible in units of programs and, for a copyrighted work that is structured by a plurality of screen designs and the like to form one piece, the print limitation can be placed in that unit (i.e., unit of data broadcast programs).

Also, the content file may be a program interlocking content file that is related to the picture data, wherein the print controlling apparatus may be further provided with a selecting unit operable to select one broadcast signal out of a plurality of broadcast signals received by the receiving unit and extract picture data from the selected broadcast signal, wherein the print instruction obtaining unit may obtain a print instruction to set at least a part of the content file and the picture data as a subject of printing, and wherein the print control information may be associated with the picture data.

Thus, the print limitation becomes possible in units of channels such as program-interlocking data broadcast, and a provider of the content can collectively place the print limitation on the program-interlocking content.

Also, the print controlling apparatus may be further provided with the displaying device. With this, it becomes possible to realize not a discrete receiver such as a Set Top Box (STB), but a print controlling apparatus as a television set that is a combination of an STB and TV.

Also, the print controlling apparatus may be further provided with the printing device and the displaying device. Accordingly, the print controlling apparatus can be realized not as a discrete receiver such as a STB, but as a television set with a built-in printer.

Also, the outputting unit may direct the printing device to print with degradation in picture quality when the print instruction is obtained and the print control information is a predetermined value. On account of this, even when printing is limited, a case where nothing is outputted for printing is avoided. The user can be notified clearly that there is print limitation and can be also encouraged to operate in order to remove the print limitation.

Also, the degradation in picture quality may be a reduced resolution on a print screen. With this, it becomes possible to set the levels of print limitation in various conditions, so that highly-detailed print limitation can be performed.

Also, the print controlling apparatus may be further provided with a reading unit operable to read individual print permission information from a storage medium, wherein the outputting unit outputs the subject of printing to the printing device when the print instruction is obtained, the print control information satisfies a first predetermined condition, and the individual print permission information satisfies a second predetermined condition.

With this, since printing is judged whether or not to be performed based on not only the print control information but also based on the individual print permission information read out from the storage medium. For example, it becomes possible to control the print limitation for each print controlling apparatus like a case where viewing/listening permission is given for a conditional access system.

Also, the print controlling apparatus may further include a communication controlling unit operable to receive an instruction from outside, an updating unit operable to update a detail of the individual print permission information in the storage medium in accordance with the instruction, a transmit controlling unit operable to externally transmit information, and an instruction obtaining unit operable to obtain a print instruction from a user, wherein the updating unit updates the individual print permission information of the storage medium in accordance with the print instruction.

This configuration allows remote control of a printer, such as control of print limitation through a new contract with a broadcast station, and also allows billing to correspond to the number of times the user has given the print instruction or the like by recording the billing information into the individual print permission information.

Moreover, the broadcast signal may further include address information indicating an address of a site selling print content on a network, and the print controlling apparatus may further include a printed matter gaining unit operable to gain a printed matter from the site selling the print content on the basis of the address information when the print instruction is obtained and the print control information indicates that printing is limited.

Accordingly, access to the site selling the print content on the network is possible on the basis of an alternate URL even when on-air-contents cannot be directly printed out. Thus, printing desired by the user can be realized.

It should be noted here the present invention may be realized not only as the above-stated print controlling apparatus, but as a print controlling method having steps corresponding to the characteristic units provided in the print controlling apparatus, and a program recorded on a recording medium for causing a computer, such as a personal computer, execute the above-mentioned steps. Also, it should be understood that as the recording-medium may include a DVD or a CD-ROM.

BRIEF DESCRIPTION OF DRAWINGS

FIG. 8 illustrates a BML example in a case where printing is restricted for the entire screen.

FIG. 9 illustrates a BML example in a case where print control is performed for a part of content.

FIG. 12 illustrates an example in a case where the operation of the browser is controlled according to print control information defined by the body part of the top page.

FIG. 15 illustrates an example in a case where print control is performed according to individual print permission information.

DETAILED DESCRIPTION OF THE INVENTION

The following is a detailed description of the embodiments of the present invention, with reference to the drawings.

First Embodiment

Figure 1:
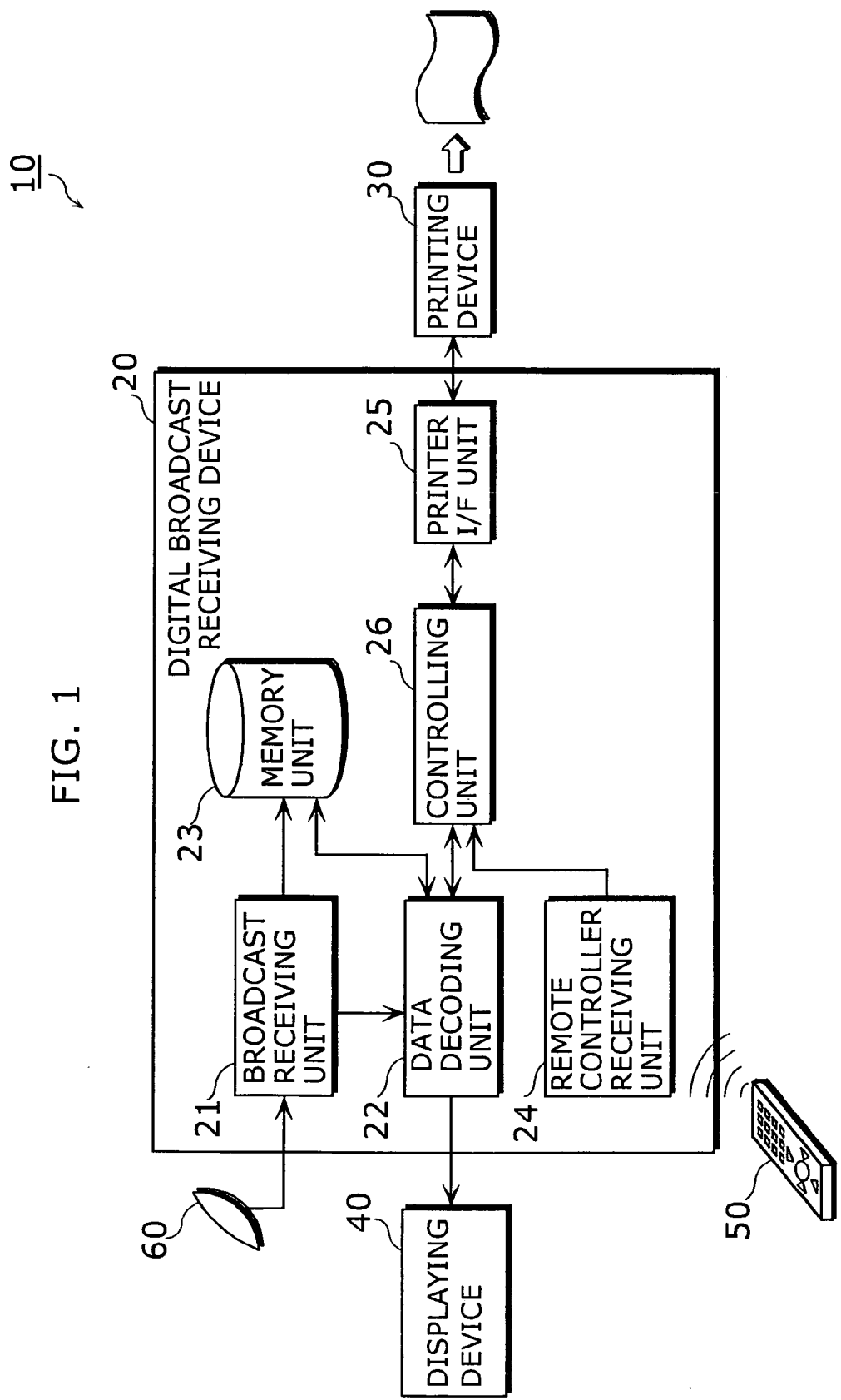
FIG. 1 is a block diagram illustrating a functional construction of a digital broadcast printing system of a first embodiment.

FIG. 1 is a block diagram illustrating the functional construction of a digital broadcast printing system 10 of the present embodiment. The present system 10 is a system that receives digital broadcast and reproduces pictures and audio, and also performs print control according to print control information transmitted in association with broadcast content, when receiving an instruction from a viewer (i.e., "user") to print the broadcast content. This digital broadcast printing system 10 is composed of a digital broadcast receiving device 20, a printing device 30, a displaying device 40, a remote controller 50, and a receiving antenna 60. It should be noted that the digital broadcast receiving device 20, the printing device 30, and the displaying device 40 can be realized as an all-in-one television receiver with a printing capability that is enclosed in one package or as a unit-type system to which each device is connected via its dedicated cable.

The digital broadcast receiving device 20 is a tuner device, such as a set top box (STB), made for digital broadcast, which decodes visual signals, audio signals and so forth from airwaves etc. received via the receiving antenna 60 or the like, and then outputs the received signals to the displaying device 40. The digital broadcast receiving device 20 also generates image data, text data, etc. based on instructions from the remote controller 50, operation buttons (not shown), and so forth, then outputs to the data the printing device 30. This digital broadcast receiving device 20 is composed of a broadcast receiving unit 21, a data decoding unit 22, a memory unit 23, a remote controller receiving unit 24, a printer I/F (interface) unit 25, and a controlling unit 26.

The broadcast receiving unit 21 selects an aimed carrier wave from the received airwaves and decodes the selected wave to reconstruct a TS (Transport Stream). The broadcast receiving unit 21 then transmits the reconstructed TS to the data decoding unit 22.

After decoding and descrambling the TS received from the broadcast receiving unit 21, the data decoding unit 22 separates it into images, audio, and data contents.

The memory unit 23 is provided with a frame buffer or the like to hold the image data and data for printing in frames to be outputted to the displaying device 40 and the printing device 30. Moreover, the memory unit 23 is provided with a hard disc, a DVD-RAM, etc. for accumulating the contents output from the data decoding unit 22.

The remote controller receiving unit 24 receives an infrared signal from the remote controller 50 and transmits the received signal to the controlling unit 26.

The printer I/F unit 25 is an interface circuit or the like that is capable of USB, IEEE 1394 bus, etc. communications for connecting the digital broadcast receiving device 20 to the printing device 30.

The controlling unit 26 is a microprocessor or the like for controlling the entire digital broadcast receiving device 20, and is provided with a ROM for storing dedicated control programs, a RAM, and so forth.

The printing device 30 performs printing according to the data for printing received via the printer I/F unit 25.

The displaying device 40 is composed of a display controlling circuit for generating a picture signal and a TV receiving circuit. It displays pictures and the like of the digital broadcast and also reproduces audio.

Figure 2:
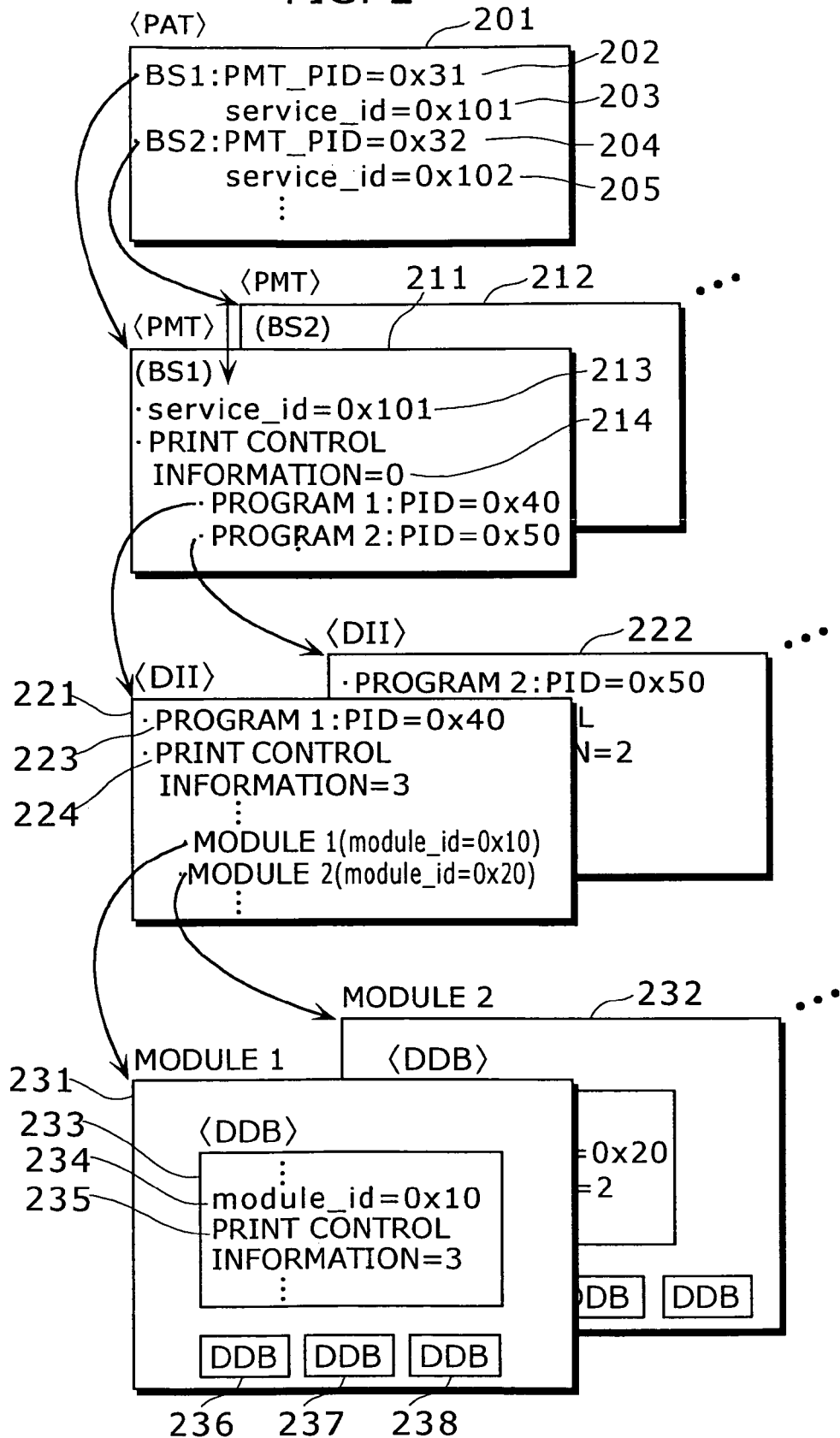
FIG. 2 illustrates an example of hierarchical table information used when the digital broadcast printing system of the first embodiment performs print control according to print control information.

FIG. 2 explains the general outlines in a case where the present digital broadcast printing system 10 performs print control according to the print control information.

For the digital broadcast, various kinds of table information is prepared for selecting one program from one channel stored in the TS. By using these sets of table information, it becomes possible to identify the program contents of the channel that is selected by the user (or, the channel that is preset). By employing a system like this, a program lineup can be freely modified, allowing the data related to the program to be multiplexed with flexibility. Examples of these sets of table information are as follows, PAT (Program Association Table), PMT (Program Map Table), and EIT (Event Information Table). In addition, under the PMT, DII (Download Info Indication) and DDB (Download Data Block) are defined hierarchically. These sets of information are stored in the TS in the form of sections.

PAT is a table in which the number of PTMs, described later, is registered in association with each location of PTMs (that is, PID (Packet Identifier) of a packet which stores the PTM).

PMT is a table that shows a component construction (pictures, audio, data, etc.) of one channel (channel), and is used for specifying a PID or the like of each component. This PMT is prepared, corresponding to each channel.

DDI is a message that describes directory information of DDB, each DDB being a small block divided from actual data of contents that make up one program of data broadcast.

As shown in FIG. 2, PMT_PID 202 (=0x31) and service_id 203 (=0x101) indicating the storage location of the PMT of the channel "BS 1" are defined in a PAT 201. Similarly, PMT_PID 204 (=0x32) and service_id 205 (=0x102) indicating the storage location of the PMT of the channel "BS 2" are defined.

Accordingly, service_id 213 (=0x101) that is the same as the stated service_id 203 is defined in the PMT 211 of the channel BS 1. In addition, "0" is defined as print control information 214 for the entire channel BS 1. It should be noted that the print control information is also defined in the PMT 212 in the same way for the channel BS 2.

Moreover, PID is defined for each program in the PMT 211 of the channel BS 1. According to the PID, it becomes possible to identify its subordinate DII and DDB in association with each other, and also possible to individually define the print control information. For example, the print control information is defined as "3" for the entire program 1 in the DII 221 of the program 1, and also the print control information is defined as "3" in the DDB 233 of the module 1 of the program 1.

Here, DDB is composed of two types of content files (for example, a content file of top page described in BML (top_page.bml) and a content file of JPEG image or the like). In more detail, DDB is formed by slicing the content file groups, every given number of bytes, arranged at a broadcast station. On the above-mentioned top page (top_page.bml), how to display the JPEG images and the like is described by the producer of the content. A STB performs print control for the content file according to the description on the top page (top_page.bml). Note that a more detailed explanation will be given below with reference to FIGS. 8 to 12.

Figures 3, 4:
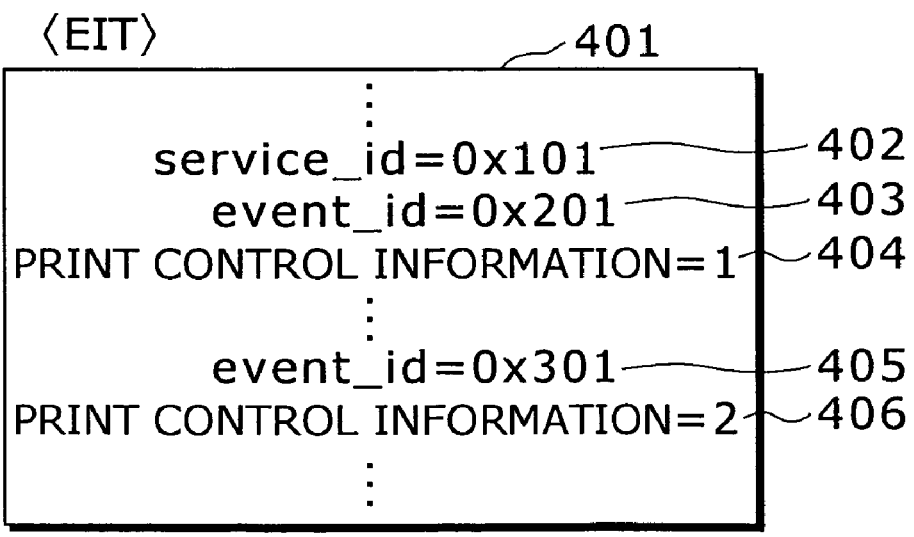
FIG. 3 illustrates an example where print control is performed in accordance with the print control information shown in FIG. 2.
FIG. 4 illustrates an example of an EIT for registering information such as a title and broadcasting data/time for each program of one channel.

FIG. 3 is an example of print control information that is shown in FIG. 2. This print control information is explained using the example of FIG. 2. In the PMT 211, for instance, the print control information for the channel BS 1 is defined as "0" and, therefore, "freely printable" in principle in regard to BS 1. However, the print control information 224 is defined as "3" in the DII 221 for the program 1 of the channel BS 1, meaning that "no printing."

FIG. 4 is an example of an EIT for registering information such as a title and broadcasting data/time for each program of one channel. As shown in FIG. 4, the EIT defines the print control information for each program of channel 1 (the storage location of data related to the program can be specified by event_id) by quoting the service_id 402 that has the same value as the service_id 213 (=0x101) of the PMT shown in FIG. 2.

Next, an explanation is given for specific examples where printing is executed using the digital broadcast printing system 10 having the construction described above.

Figure 5A:
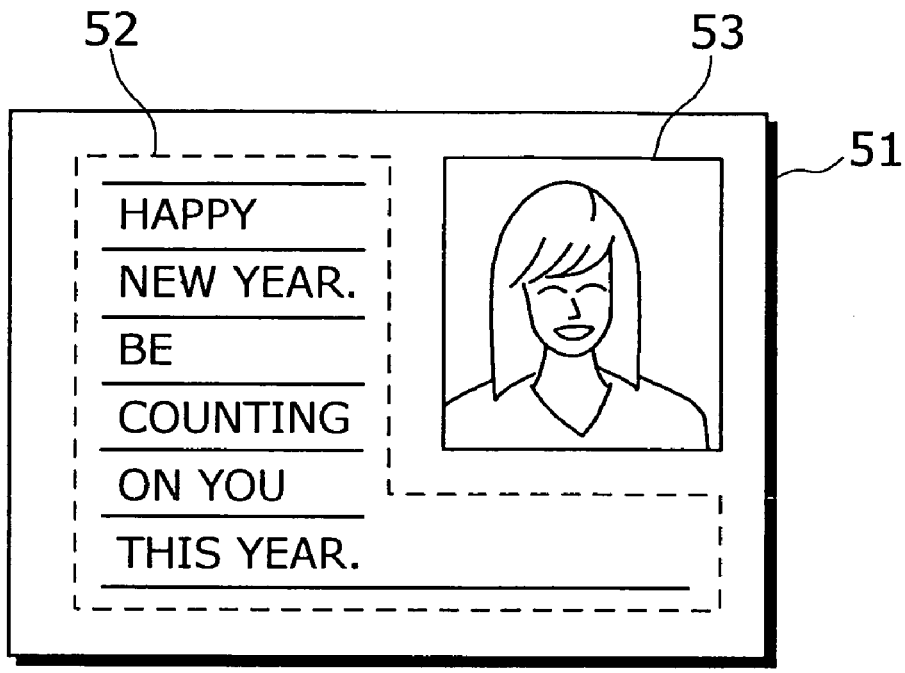
FIG. 5 illustrates printing examples resulting from a print instruction from the viewer in a case where text and a picture are displayed together on one screen.
Figure 5B:
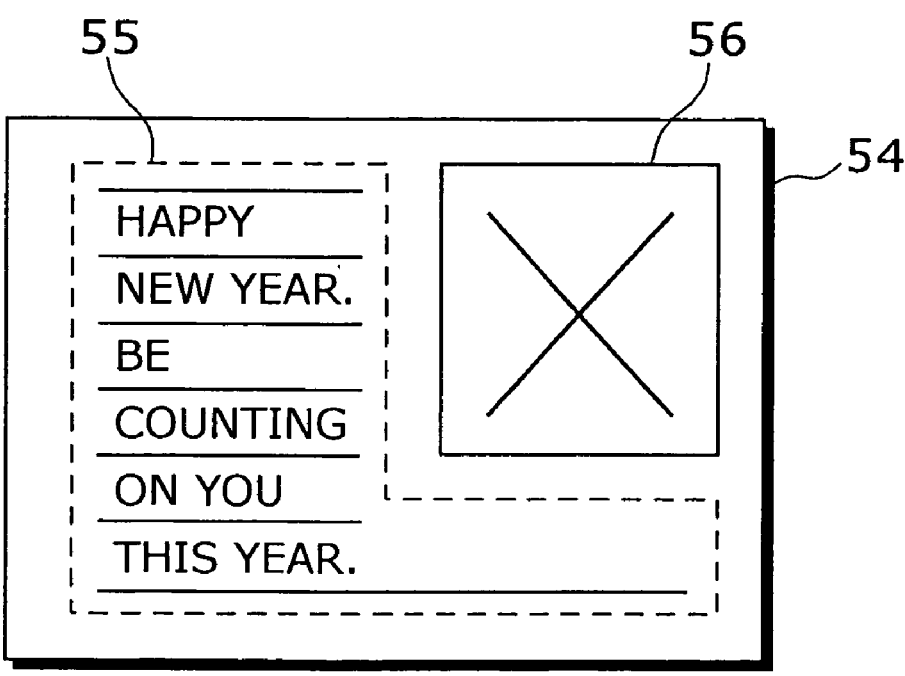

FIGS. 5A and 5B illustrates a screen display example and a printing example resulting from a print instruction from the viewer in a case where text and a picture are displayed together on one screen. As shown in FIG. 5A, a text 52 and a picture 53 related to this are displayed on a screen 51. In this state, when an instruction to "print" is received from the viewer using the remote controller 50 or the like, the controlling unit 26 refers to the above-mentioned DII or DDB, via the data decoding unit 22, by which the text 52 and the picture 53 are defined, then reads out the details of each corresponding print control information. If the print control information corresponding to the picture 53 is "3," an "X" mark 56 indicating that printing is restricted would be printed on a part corresponding to the picture 53 in a printing result 54 as shown in FIG. 5B.

It should be noted that not only the indication that printing is inhibited is given in the printing result 54, but also the user is notified in advance according to the user's instruction or on a mandatory basis to acknowledge that printing is restricted (for example, the "X" mark indicating No Printing may be displayed on a print preview screen). For instance, when an instruction to show the "print preview" is received by the user on the screen shown in FIG. 5A, the screen is switched to the print preview screen and the screen shown in FIG. 5B is displayed. When an instruction only to "print" is given by the user and the screen includes a part that is restricted from printing, the screen is forcefully switched to the "print preview screen" and the screen shown in FIG. 5B is displayed to notify the user that the screen includes the part that is restricted from printing.

Figure 6A:
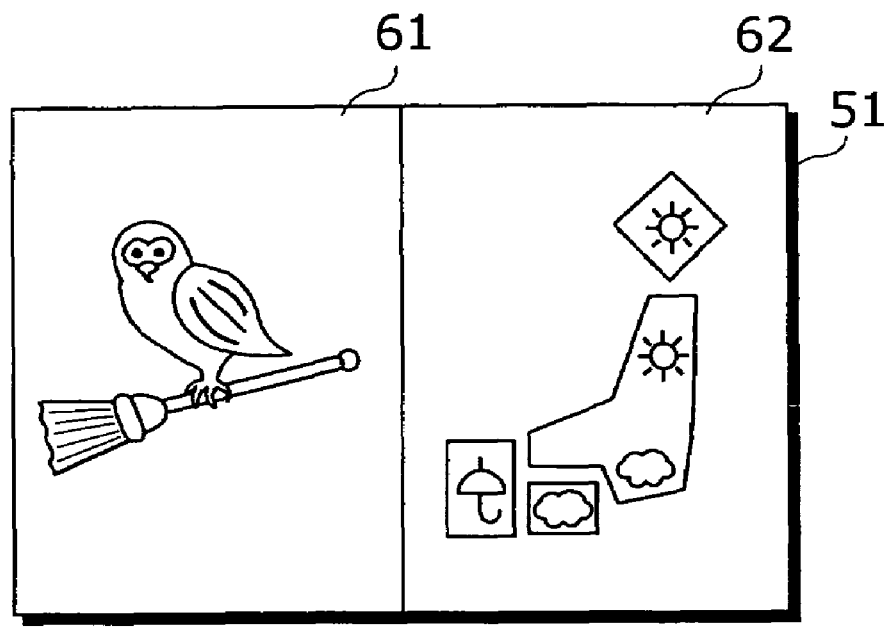
FIG. 6 illustrates printing examples resulting from a print instruction from the viewer in the case of multiple displays.
Figure 6B:
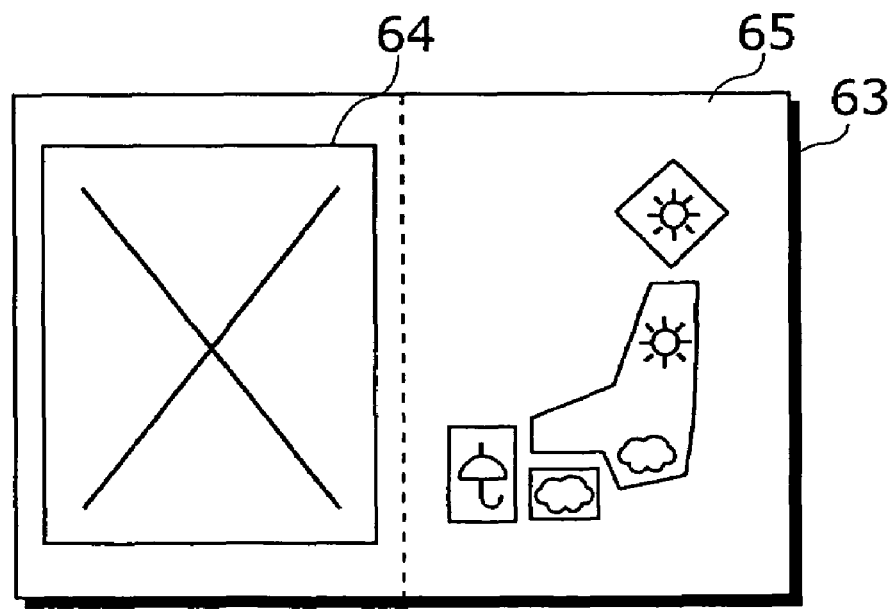

FIG. 6 illustrates a screen display example and printing example resulting from a print instruction given by the viewer in a case where a multi-display is shown. In FIG. 6A, a picture 61 from a movie is displayed on the left half of the screen 51 and a picture 62 from a weather forecast is displayed on the right half. In this state, when an instruction to "print" is received from the user as is the case with FIG. 5, the controlling unit 26 as is expected refers to the above-mentioned DII or DDB by which the picture 61 from the movie and the picture 62 from the weather forecast are defined, then reads out the details of each corresponding print control information. If the print control information corresponding to the picture 61 from the movie is "3," printing is not executed regarding the picture 61 from the movie and an "X" mark 64 is printed as a printing result 63 as shown in FIG. 6B.

Figure 7A:
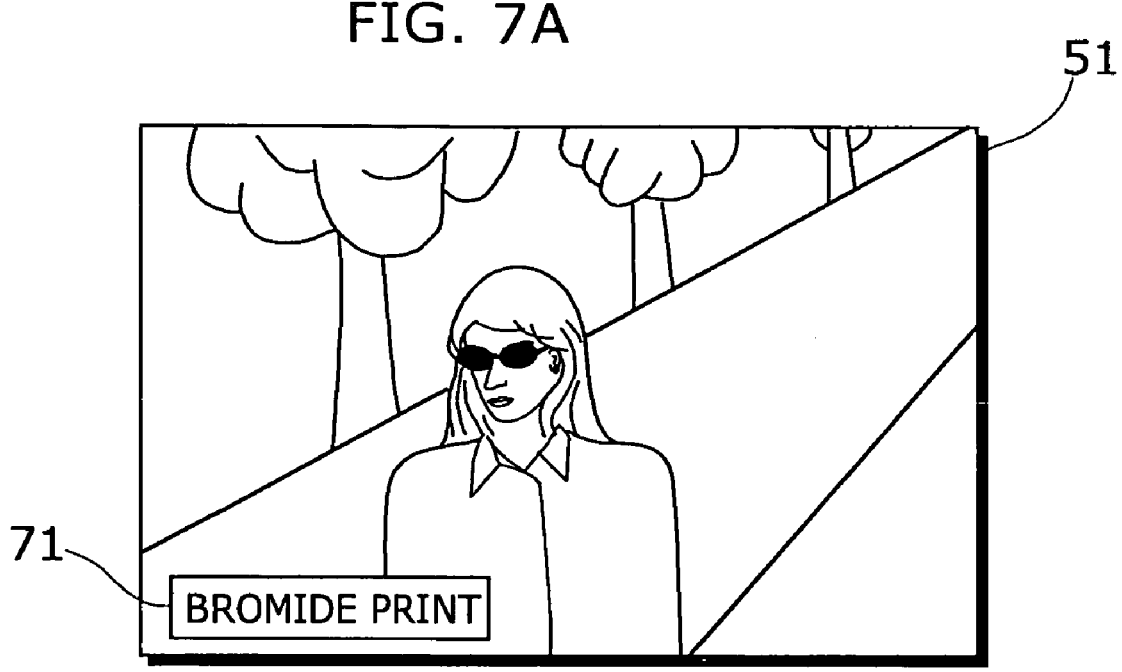
FIG. 7 illustrates printing example resulting from a print instruction from the viewer to print program-interlocking content in a case where a picture is displayed on a screen.
Figure 7B:
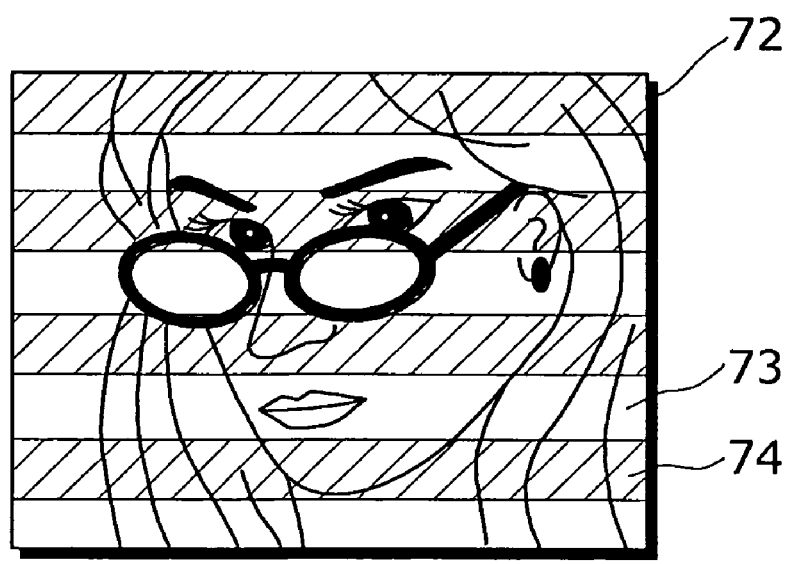

FIG. 7 illustrates a screen display example and a printing example resulting from a print instruction from the viewer to print program-interlocking contents when a picture is displayed on the screen. FIG. 7A is a picture example of one scene from a movie. In this case, a bromide print button 71 is displayed at the lower left of the screen 51, meaning that it is possible to execute a bromide printing of an actress displayed on the screen 51 as program-interlocking content. In this state, when an instruction to "print" is received from the user, the controlling unit 26 refers to the DII or DDB by which the program-interlocking content is defined, and then reads out the details of the corresponding print control information. If the print control information corresponding to this bromide is "2," a printing result 72 is generated in which a part 73 at a normal resolution and a part 74 at a low resolution are mixed in stripes as the printing result 72, as shown in FIG. 7B.

The following is a specific explanation about a case where print control is performed by defining the print control information <print_ctrl> on the top page <top_page.bml> of the DDB.

FIG. 8 illustrates a BML example in a case where printing is restricted for the entire screen. As shown in FIG. 8A, the print control information corresponding to the content represented by the top page <top_page.bml> is defined using <print_ctrl> as a new tag for a header part between <head> and </head> of the top page <top_page.bml>. In the case of the example shown in FIG. 8A, No Printing is specified by copy="never (=3)". In a case where BML is defined as in FIG. 8A, even if the user issues a print instruction, the printer or the STB controls to print out the "X" mark indicating that printing is restricted as the printing result.

FIG. 9 illustrates a BML example in a case where print control is performed for a part of the content. In the case of FIG. 9A, No Printing is specified by copy="never" for the JPEG file (image/jpeg). Therefore, even if the user issues a print instruction, the printer or the STB controls to print out the "X" mark indicating that printing is restricted as a printed image of the JPEG picture part as shown in FIG. 9C (or, the STB's side displays "No Printing" on the screen to notify the user of it).

Figure 10A:
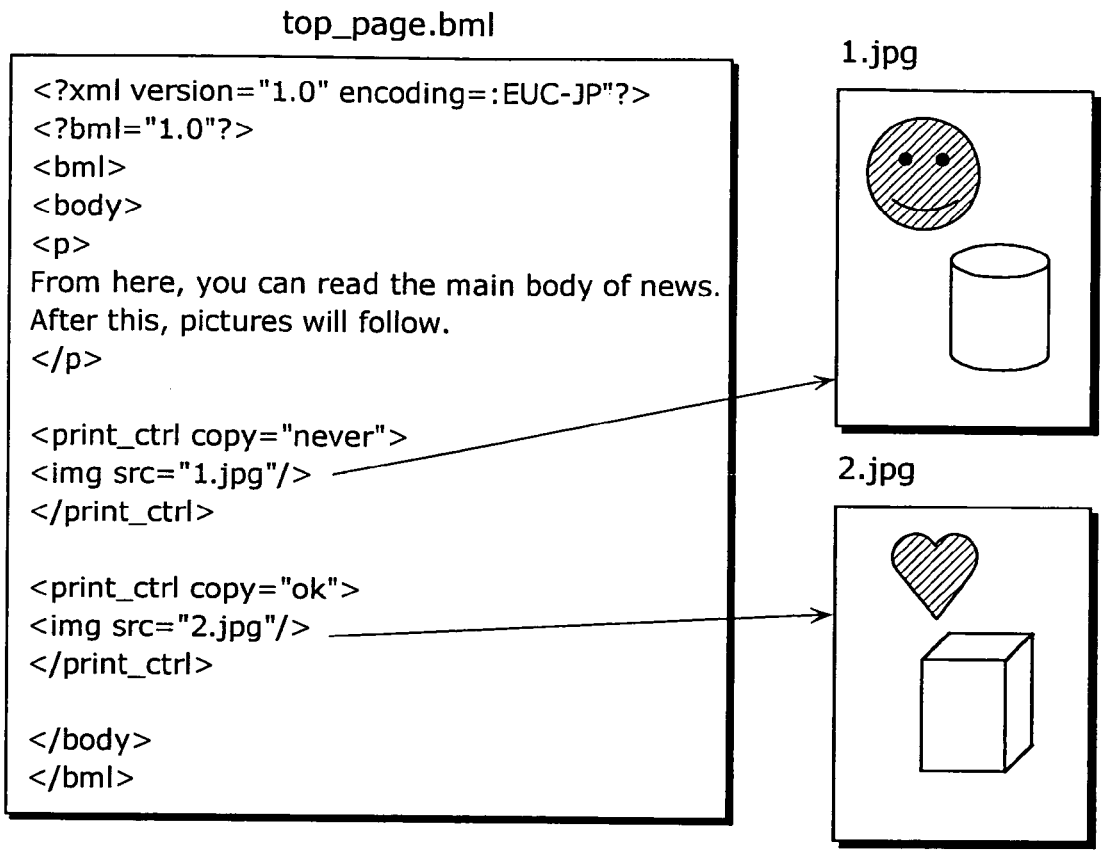
FIG. 10 illustrates a BML example in a case where print control is performed for each file in a body part of a top page.
Figure 10B:
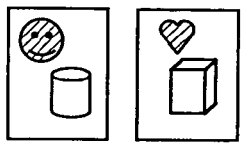
Figure 10C:
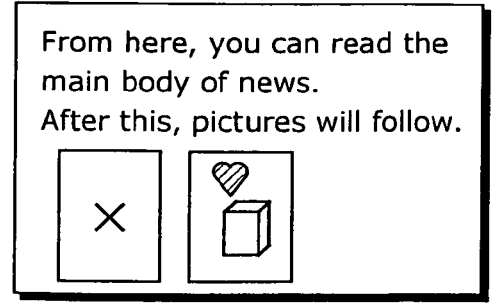

FIG. 10 illustrates a BML example in a case where print control is performed for each file in a body part of the top page. In the example of FIG. 10A, No Printing is defined by copy="never" for the individual JPEG files. With this, even if the user issues a print instruction, the printer or the STB controls to print out the "X" mark indicating that printing is restricted for the JPEG picture "1.jpeg" whose <print_ctrl> is "never" as shown in FIG. 10C.

Figure 11A:
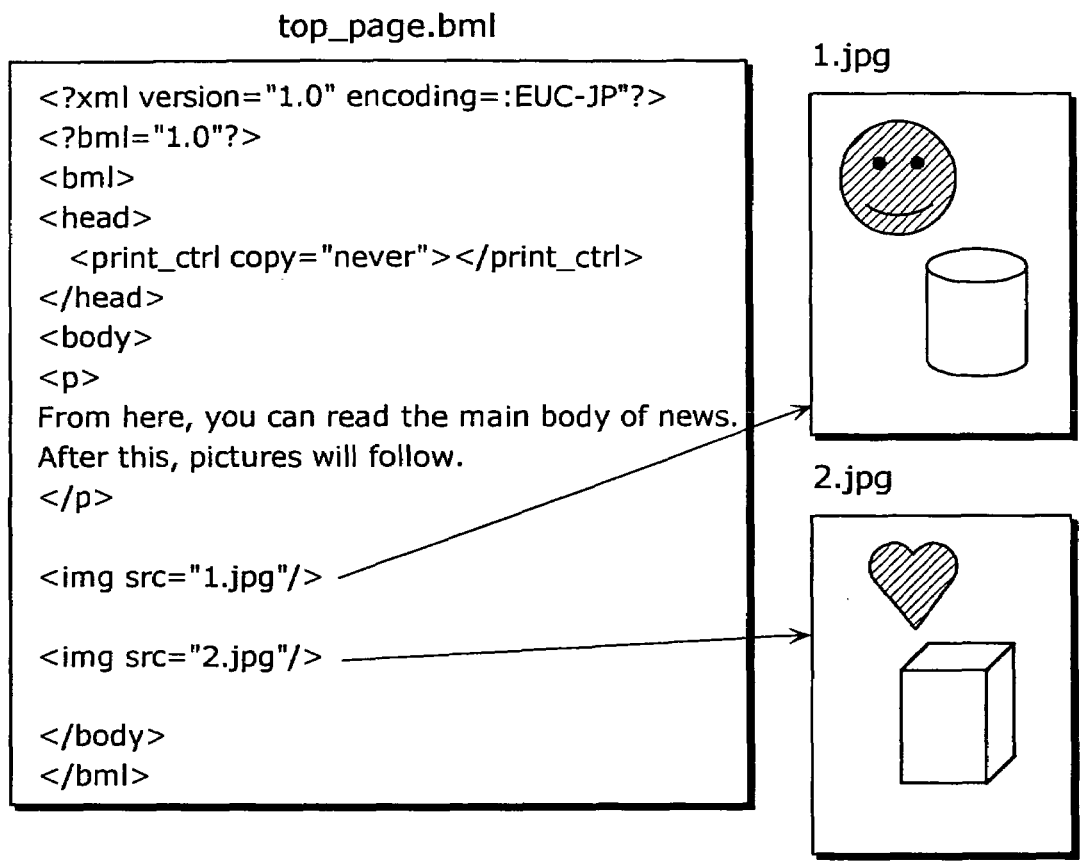
FIG. 11 illustrates an example in a case where an operation of a browser is controlled according to print control information defined by the BML of the top page.
Figure 11B:
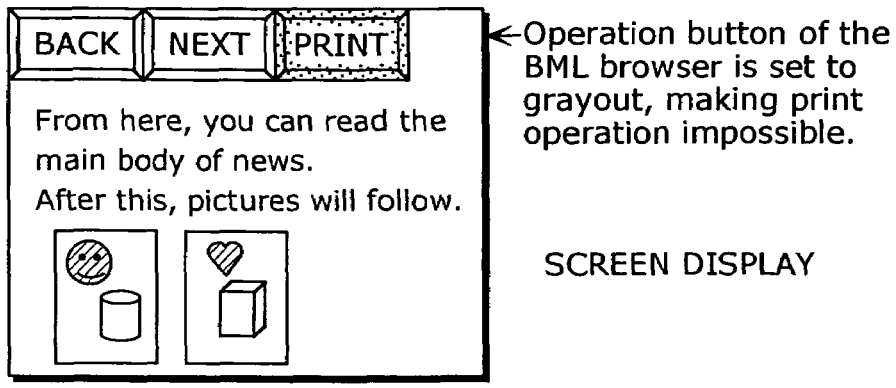

FIG. 11 illustrates an example in a case where an operation of the browser is controlled according to the print control information defined by the BML of the top page. As shown in FIG. 11A, the print control information corresponding to the content represented by the top page <top_page.bml> is written using the print permission information tag <print_ctrl> for a header part between <head> and </head> of the top page <top_page.bml>. In the case of FIG. 11A, No Printing is specified by copy="never". By defining in this way, a print button (one of the operation buttons of the BML browser) is controlled to grayout (=indicating it is in an inactive state) on the screen so as to notify the user that printing is restricted. It should be noted here that in a case where "No Printing" is specified for the entire channel or program, the print button is also switched to the grayout display.

FIG. 12 illustrates an example in a case where the operation of the browser is controlled according to the print control information defined by the body part of the top page. As shown in FIG. 12A, No Printing is specified by copy="never" for the individual JPEG files. With this, when the cursor on the screen moves, by the user operation, to a position of the JPEG picture for which printing is restricted, the print button is controlled to grayout so as to notify the user that the printing is restricted.

Figure 13:
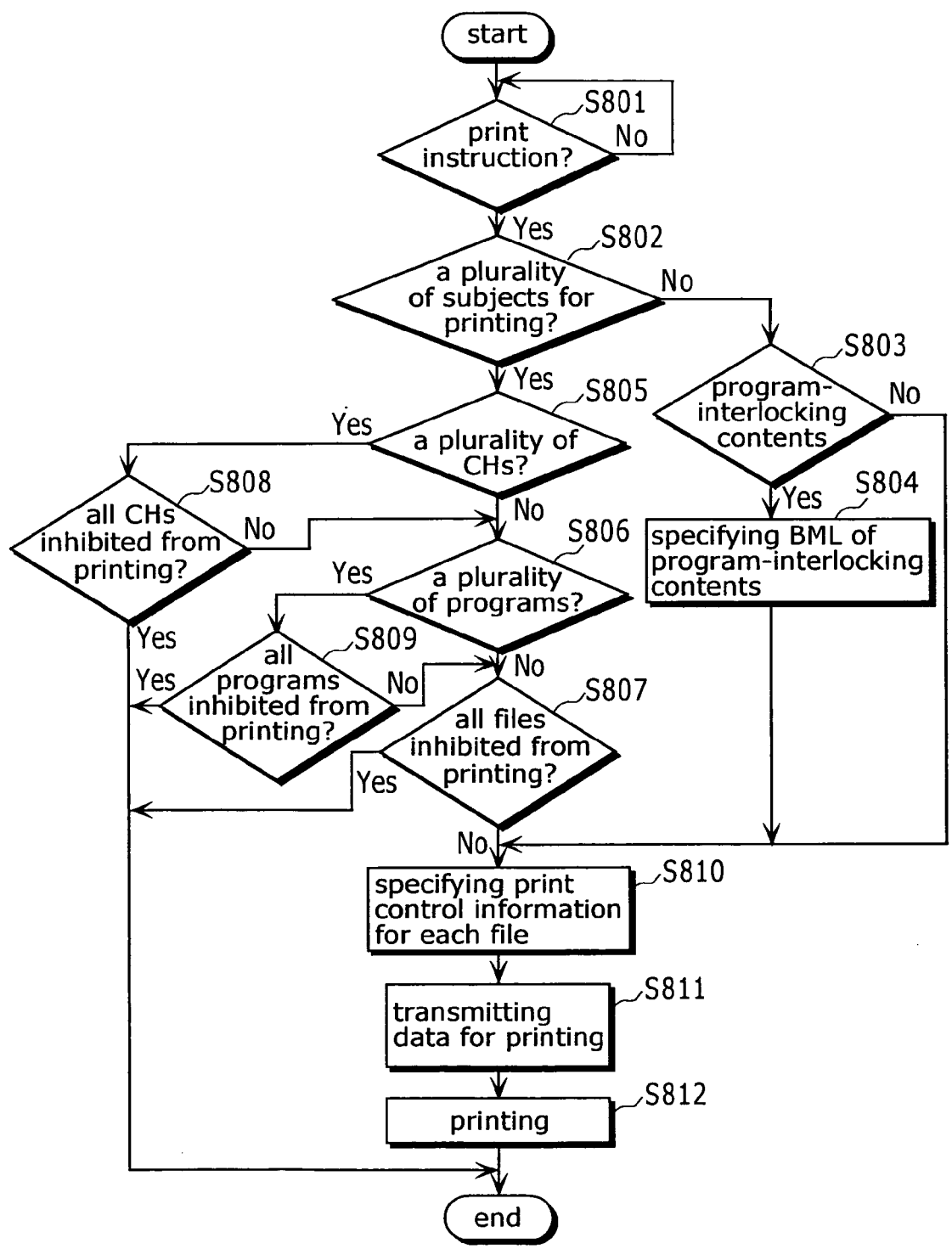
FIG. 13 is a flowchart illustrating a process flow of the entire digital broadcast printing system of the first embodiment.

FIG. 13 is a flowchart illustrating a process flow of the entire digital broadcast printing system 10 constructed as described so far.

First, when receiving a "print" instruction from the viewer (S801), the controlling unit 26 checks on the structure of the currently-displayed screen at that point in time, and verifies whether the number of subjects for printing is one or more (S802), whether there is program-interlocking content (S803), whether more than one channel is displayed (S805), whether more than one program is displayed (S806), and so on. Here, regarding whether the number of subjects for printing is one or more and whether there is program-interlocking content, the verification is performed according to the DII, for example. Also, regarding whether more than one channel is displayed and whether more than one program is displayed, the verification is performed according to the PAT, for example.

Next, the controlling unit 26 checks the corresponding print control information for each picture displayed on the screen (S810), and then transmits data for printing to the printing device 30 to perform printing appropriate to each set of print control information (S811).

When receiving the data for printing from the digital broadcast receiving device 20, the printing device 30 performs printing according to the received data (S812).

Accordingly, in the digital broadcast printing system 10, the provider of the broadcast content previously transmits the print control information in association with the content, and the receiver's side of the content performs printing according to this print control information. Thus, it becomes possible for the provider's side of the broadcast content to principally control print-outs of pictures by the user.

Second Embodiment

Figure 14:
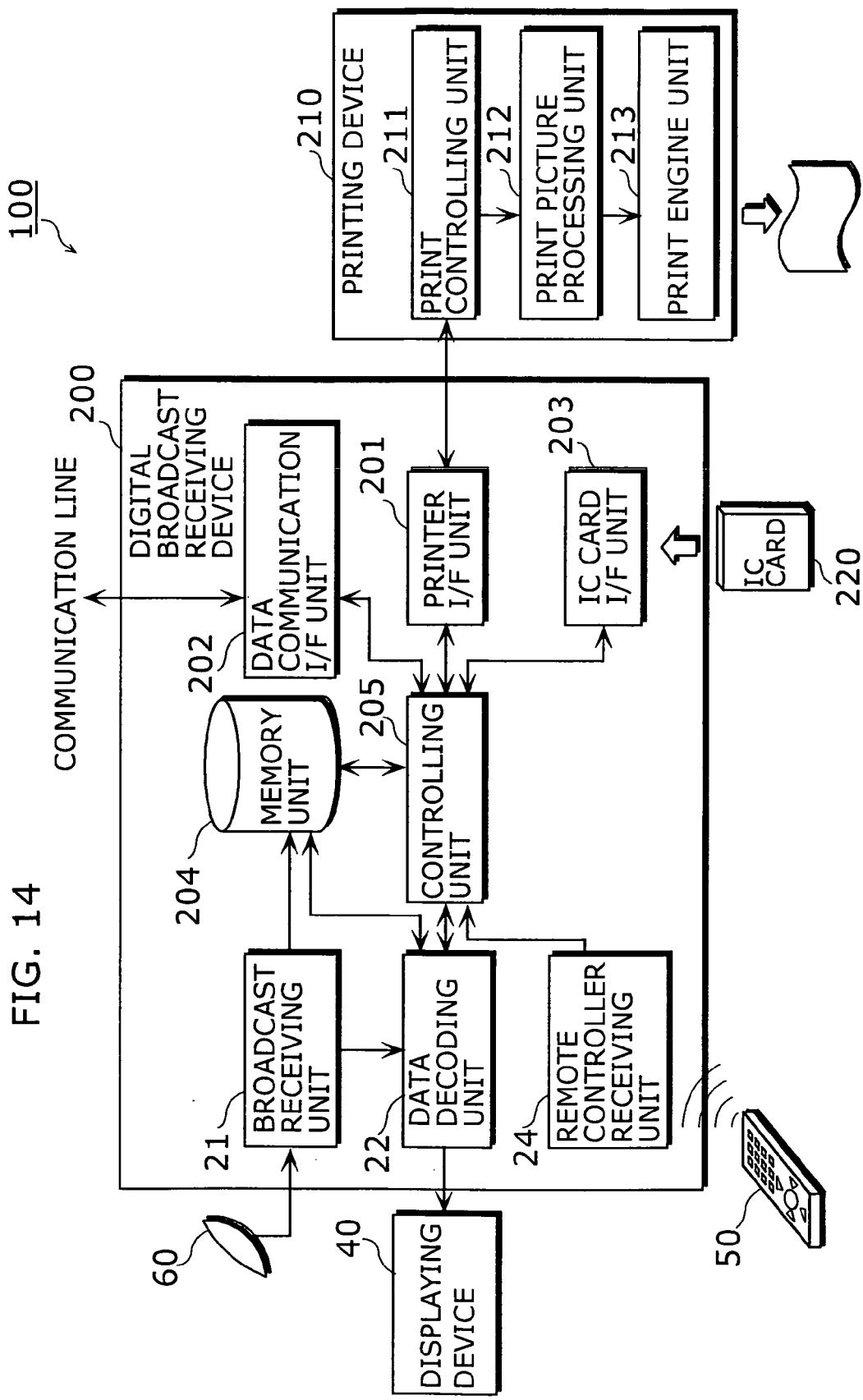
FIG. 14 is a block diagram illustrating a functional construction of a digital broadcast printing system of a second embodiment.

FIG. 14 is a block diagram illustrating the functional construction of a digital broadcast printing system 100 of the present embodiment. This digital broadcast printing system 100 receives digital broadcast and reproduces pictures and audio. When receiving an instruction from a viewer to print the pictures, it controls printing performances according to the print control information and individual print permission information in an IC card. Moreover, the present system 100 is a system that can control printing in accordance with the details of a contract etc. made in real time using a communication line or the like. This digital broadcast printing system 100 is composed of a digital broadcast receiving device 200, a displaying device 40, a remote controller 50, a printing device 210, and a receiving antenna 60. It should be noted that the digital broadcast receiving device 200, the displaying device 40, and the printing device 210 can be realized as an all-in-one television receiver with a printing capability that is enclosed in one package or as a unit-type system to which each device is connected via its dedicated cable.

Hereafter, the explanation is given with emphasis on components which are different from those of the digital broadcast printing system 10 of the stated first embodiment. The same numerals are given to the common components, and an explanation for them is omitted.

The digital broadcast receiving device 200 is a tuner device, such as a set top box (Set Top Box) for example, made for digital broadcast, and is provided with the function of the digital broadcast printing system 10 of the stated first embodiment. Also, it controls picture printing using the individual print permission information registered in the IC card for the viewer who holds a conditional access contract. This digital broadcast receiving device 200 is composed of a broadcast receiving unit 21, a data decoding unit 22, a memory unit 204, a remote controller receiving unit 24, a printer I/F unit 201, a data communication I/F 202, an IC card I/F unit 203, and a controlling unit 205.

The printer I/F unit 201 is an interface circuit or the like that is capable of USB, IEEE 1394 bus, etc. communication for connecting this digital broadcast receiving device 200 to the printing device 210.

The data communication I/F unit 202 is a telephone modem or the like used for bidirectionally exchanging data between the digital broadcast receiving device 20 and a digital broadcast sending device via a communication network (both not shown).

The IC card I/F unit 203 is a reader/writer or the like made for reading/writing to/from an IC card. The IC card I/F unit 203 reads/writes data related to the contract, security, billing, and so forth regarding the conditional access from/to an IC card 220 that is used when the digital broadcast is employed according to the conditional access system (Conditional Access System: CAS). Note that the IC card 220 holds unique identification information (card ID) and watched-program history information in an internal memory and is provided with a circuit or the like to securely hold these sets of information. When the IC card 220 is inserted into the IC card I/F unit 203, the card ID is transmitted to the digital broadcast receiving device 200 and is used as the user information for identifying the user of the digital broadcast receiving device 200.

The memory unit 204 is provided with a frame buffer or the like to hold a picture signal and image data in frames to be outputted to the printing device 210 and the displaying device 40. Moreover, the memory unit 204 is provided with a hard disc, a DVD-RAM, etc. for accumulating the contents outputted from the data decoding unit 22.

The controlling unit 205 is a microprocessor or the like for controlling the entire digital broadcast receiving device 200, and is provided with a ROM for storing dedicated control program, a RAM, and so forth.

The printing device 210 performs printing of pictures etc. according to the data for printing and individual print permission information received via the printer I/F unit 25. The printing device 210 is composed of a print controlling unit 211, a print picture processing unit 212, and a print engine unit 213.

The print controlling unit 211 is a microcomputer or the like that is provided with a ROM, a RAM, etc. to control the entire printing device 210.

The print picture processing unit 212 performs conversion, processing, etc. on the data for printing according to the data for printing and the individual print permission information received via the print controlling unit 211. For example, a part of print area is shown by "X" as shown in FIG. 5B of the stated first embodiment and, similarly, a part of the area is shown at a low resolution as shown in FIG. 7B (there are methods achieved by focusing on one pixel value, then changing surrounding pixel values into that focused value, and by changing surrounding pixels into white or black).

Note that although the print picture processing unit 212 performs conversion, processing, etc. on the data for printing in the present embodiment, the digital broadcast receiving device 200 may be provided with this function.

The print engine unit 213 is a printer engine employing the ink jet system or the like and prints color or monochrome pictures on plain paper etc. in accordance with the data transmitted from the print picture processing unit 212.

FIG. 15 illustrates an example in a case where print control is performed according to the individual print permission information. Here, "Pay per Print" refers to a printing system with which every time a picture or image is printed out, appropriate billing processing is performed. For example, in FIG. 7 of the stated first embodiment, when the viewer individually makes a contract to have a normal printing, but not printing in stripes, printing in a high resolution becomes possible.

Figure 16:
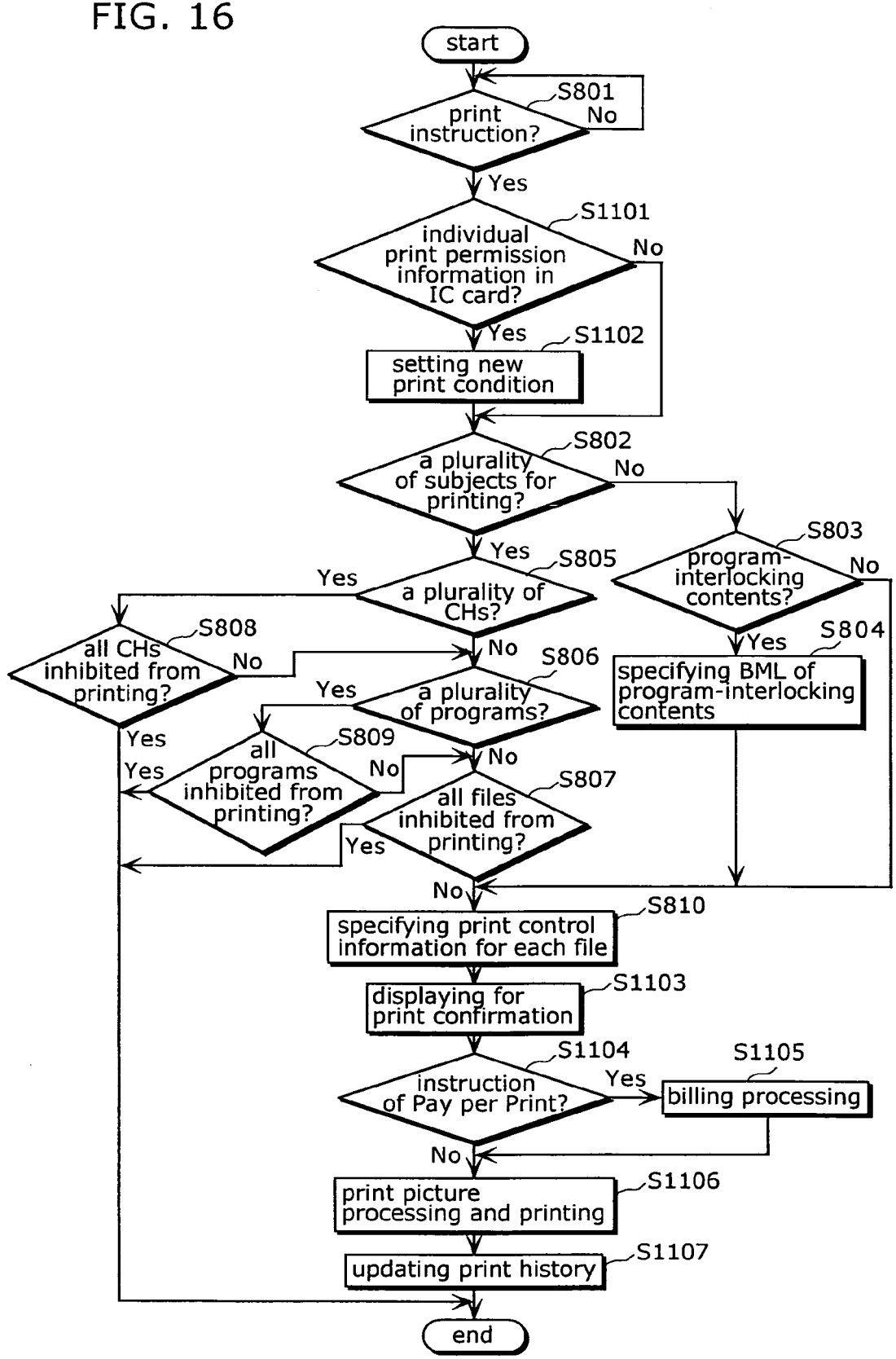
FIG. 16 is a flowchart illustrating a process flow of the entire digital broadcast printing system of the second embodiment.

FIG. 16 is a flowchart illustrating a process flow of the entire digital broadcast printing system 100 constructed as described so far.

First, when receiving a "print" instruction from the viewer (S801), the controlling unit 205 verifies at that point in time via the IC card I/F unit 203 whether the individual print permission information is stored in the IC card 220 (S1101).

If the individual print permission information is stored (S1101: Yes), a new print condition is set in consideration of the print control information of the stated first embodiment (S1102). Thereafter, the same judgments are made as is the case with the stated first embodiment according to the newly set print condition (S802 to S810).

Next, the controlling unit 205 provides a display to have the viewer confirm the printing or to notify the viewer that the printing is restricted under the present circumstances (S1103). With this, when receiving an instruction of "Pay per Print" from the viewer, the controlling unit 205 conducts the billing processing (or contract processing etc.) that makes "Pay per Print" possible with a broadcasting business company or the like via the data communication I/F unit 202 (S1105).

Finally, the controlling unit 205 transmits the individual print permission information and the data for printing to the printing device 210 via the printer I/F 201. When receiving the data for printing, the printing device 210 performs image processing on the data for printing according to the individual print permission information and then executes printing in accordance with the data on which the image processing has been performed (S1107).

Accordingly, when the viewer holds the conditional access contract, the digital broadcast printing system 100 performs the print control for the viewer according to the individual print permission information in consideration of the stated print control information. Also, it performs the print control corresponding to the contract made in real time. Thus, it becomes possible to provide a printing system that has a high convenience for both the provider and viewer, with copyright of the broadcast contents being protected.

Third Embodiment

In the first and second embodiments described above, the explanation has been given for the digital broadcast printing system that controls printing of broadcast content according to the print control information and individual print permission information in the IC card. In the present embodiment, an explanation will be given for a digital broadcast printing system that realizes printing desired by the user via a network such as the Internet even when broadcast content cannot be printed out. Note that, hereinafter, the same functional components as those in the above-described first and second embodiments are given the same numerals, and an explanation thereof is omitted.

A digital broadcast printing system 300 (not shown) of the present embodiment has basically the same functional construction as the digital broadcast printing system 100 of the stated second embodiment. It is composed of a digital broadcast receiving device 400 (not shown), a printing device 210, a displaying device 40, a remote controller 50, and an antenna 60, and an IC card 220. The difference between the digital broadcast receiving device 200 and the digital broadcast receiving device 400 is that the digital broadcast receiving device 400 is provided with a controlling unit 405 (not shown) replacing the controlling unit 205 of the digital broadcast receiving device 200.

The controlling unit 405 is a microprocessor or the like for controlling the entire digital broadcast receiving device 400, and is provided with a ROM for storing dedicated control programs, a RAM, and so forth. Moreover, the controlling unit 405 performs control to allow getting the printing of content desired by the user by accessing to a print content selling site via a network such as the Internet under the user's direction even when the broadcast content cannot be printed out. Furthermore, the controlling unit 405 interprets the print control information stored in the hierarchical table of the received broadcast content and the individual print permission information stored in the IC card 220. Based on these details, the controlling unit 405 makes a judgment of whether or not the broadcast content can be printed and a judgment of the printing style, and performs control to gain a printed matter via a network such as the Internet.

Figure 17:
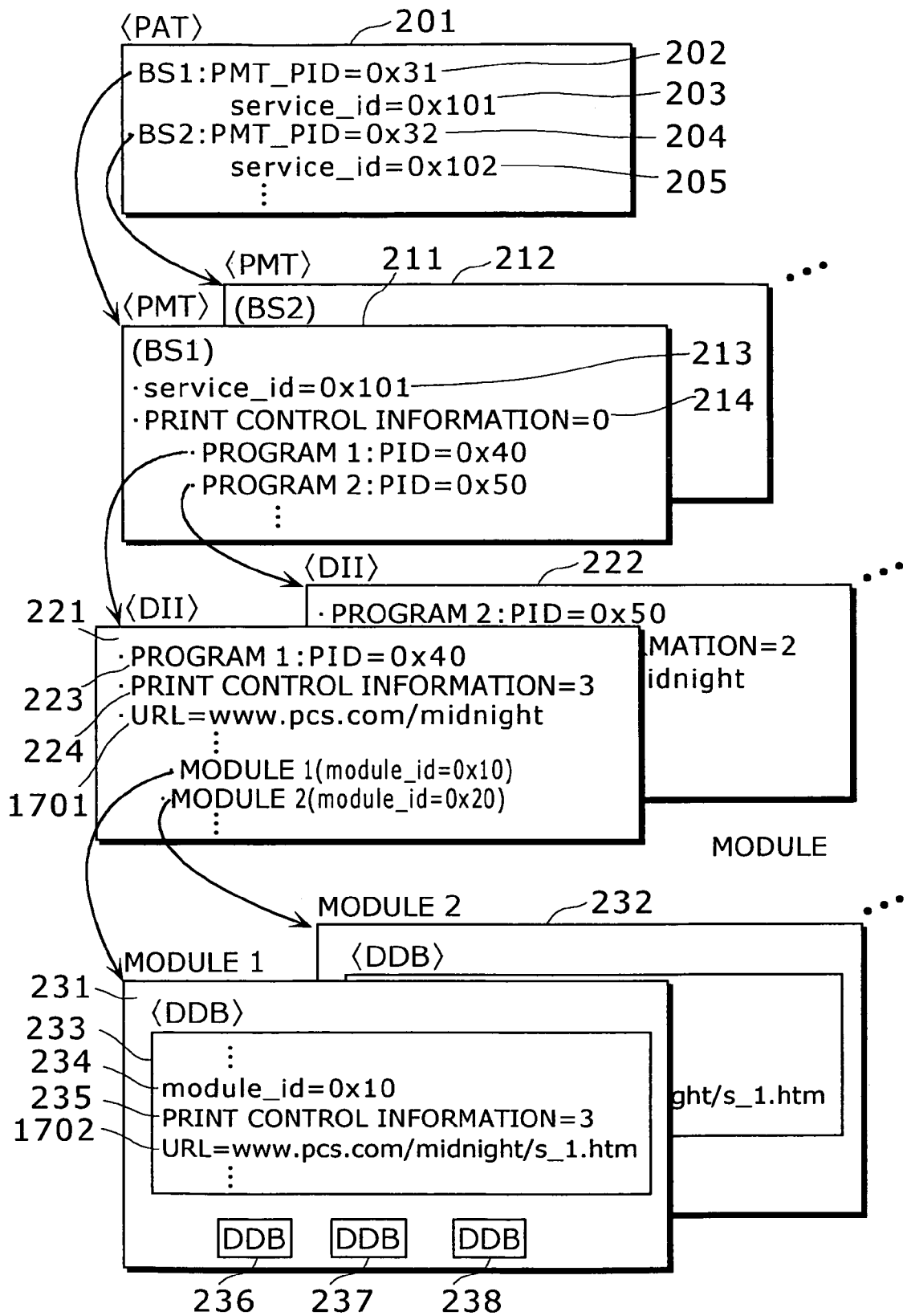
FIG. 17 is an example of hierarchical table information used when a digital broadcast printing system of a third embodiment performs print control according to print control information and an alternate URL.

FIG. 17 is an example of hierarchical table information used when the digital broadcast printing system 300 of the present embodiment performs print control according to the print control information etc. As shown in FIG. 17, in the DDI, that is, directory information defined for each content forming the program 1, "www.pcs.com/midght (in this case "HTTP://" is omitted) that is an alternate URL (namely, URL indicating the address of the print contents selling site on the Internet) is defined for the user who wishes to print out with respect to the contents of the program 1. The controlling unit 405 performs control to gain the printed matter by accessing to the site selling the print content that is indicated by this alternate URL under the user's direction when Internet access is possible. Note that, as shown in FIG. 17, when an alternate URL 1702 "www.pcs.com/midght/s_1.htm" is defined in a DDB 231 (for example, one scene in the program 1) that is directory information of a subordinate module 1 of the DII 221, the controlling unit 405 may perform control to gain the printed matter of one scene of the program 1 according to this alternate URL as in the above case.

Figure 18:
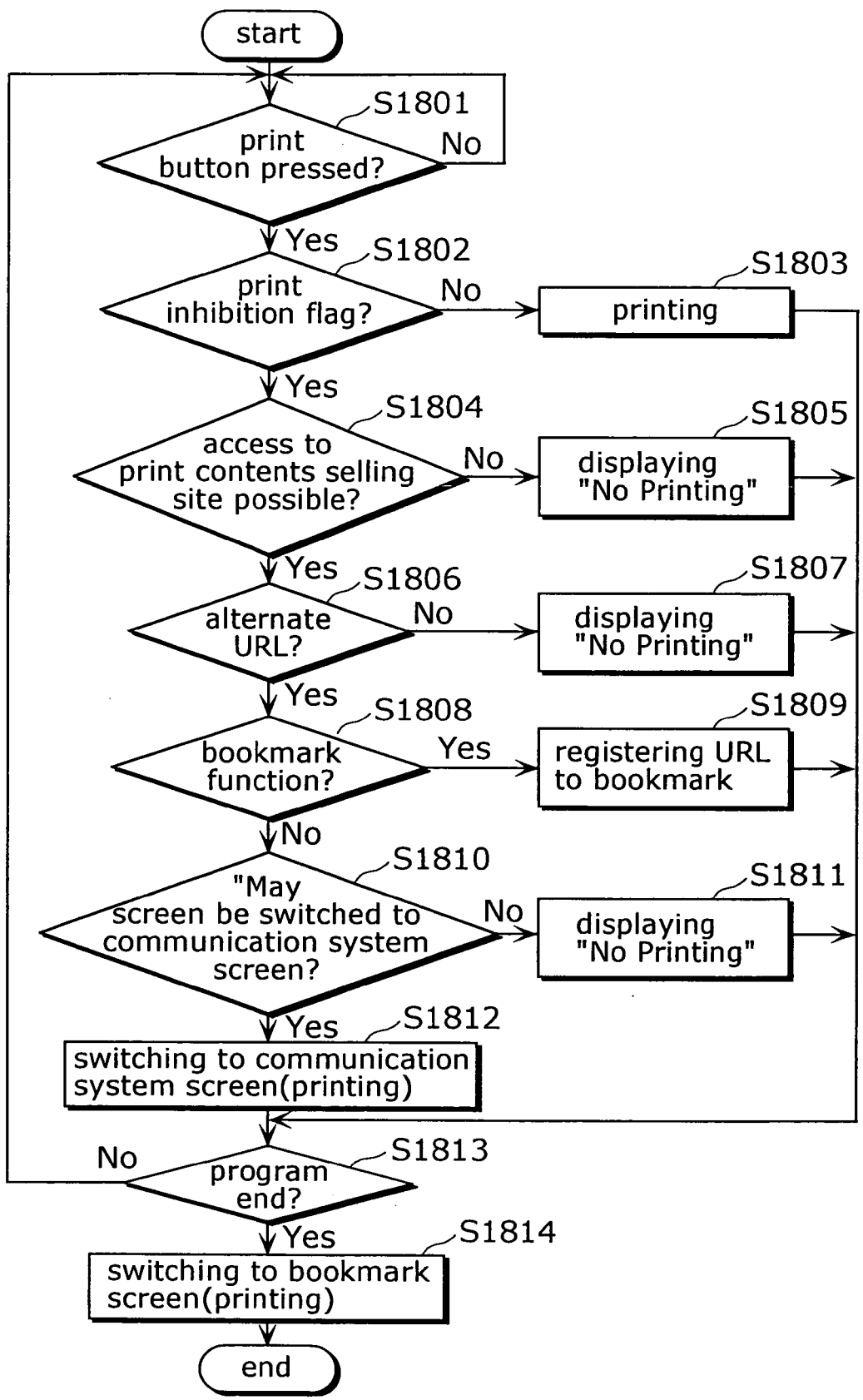
FIG. 18 is a flowchart illustrating a process flow of a controlling unit in a case where a user performs printing of desired contents via a network.
Figure 19A:
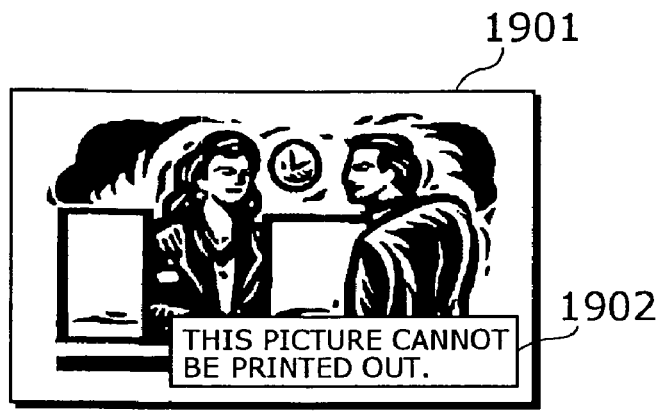
FIG. 19A is a screen example displayed on a displaying device that shows printing cannot be performed for the contents specified by the user in the third embodiment.
Figure 19B:
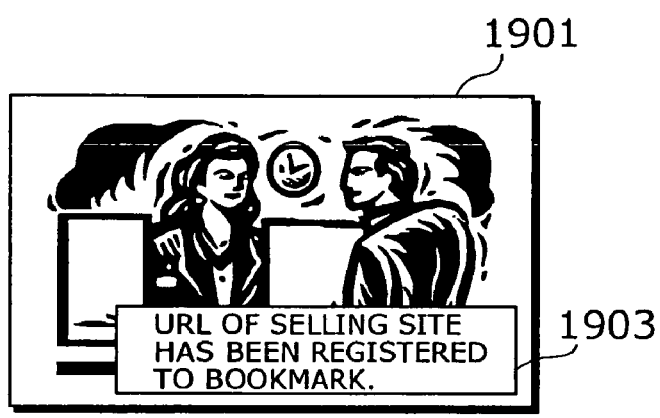
FIG. 19B is a screen example displayed on the displaying device that shows the alternate URL specified by the user has been registered to a bookmark in the third embodiment.
Figure 19C:
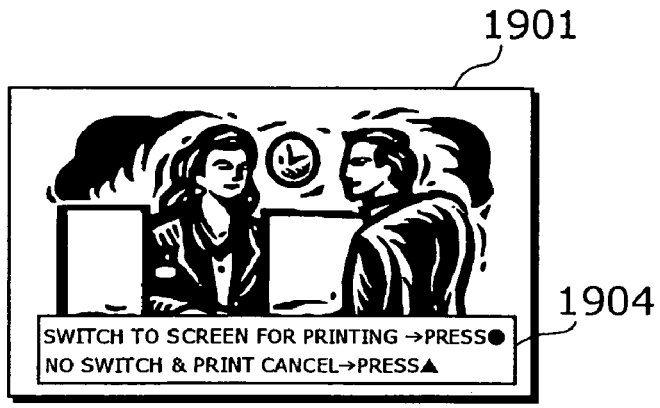
FIG. 19C is a screen example displayed on the displaying device to receive an instruction from the user in regards to whether or not the screen may be switched to a communication system screen in the third embodiment.
Figure 19D:
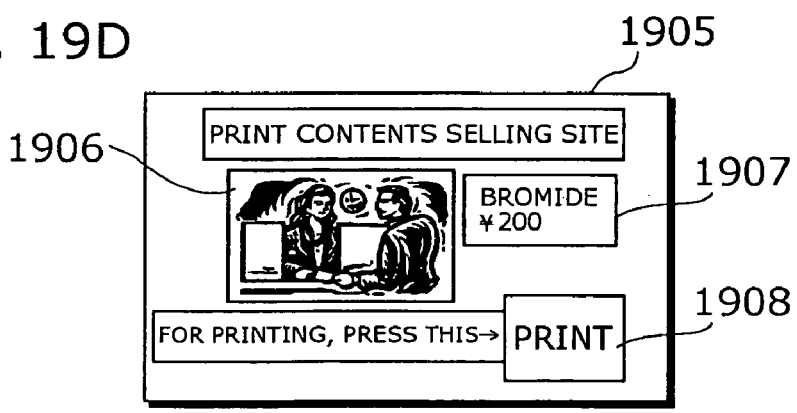
FIG. 19D is a screen example displayed on the displaying device to receive a print instruction from the user when access to a site selling print content is established in the third embodiment.
Figure 20:
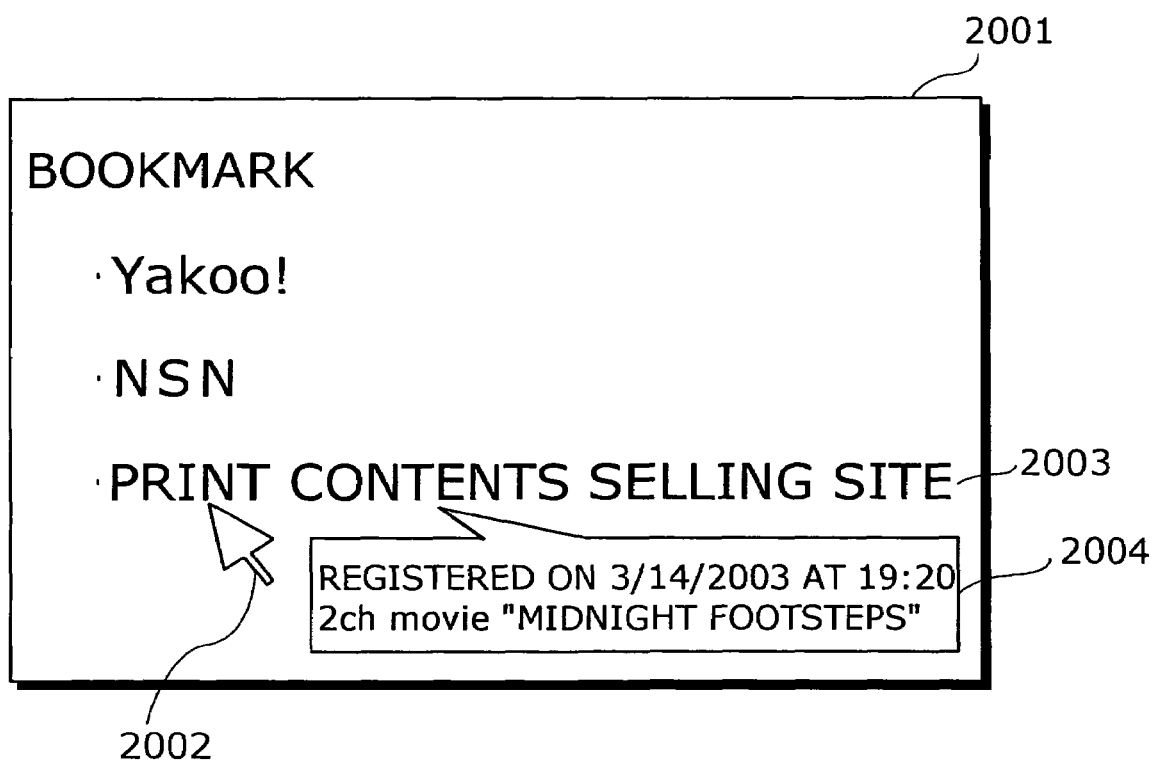
FIG. 20 is a screen example of a bookmark screen in the third embodiment.

The following is an explanation of a practical example in a case where the user performs printing of the desired contents via a network in the present embodiment, with reference to FIGS. 18 to 20.

FIG. 18 is a flowchart illustrating a process flow of the controlling unit 405 in a case where the user performs printing of the desired contents via a network even when the broadcast contents cannot be printed out. FIGS. 19A to 19D and FIG. 20 are screen examples displayed on the displaying device 40 in the present embodiment.

As shown in FIG. 18, when firstly receiving a depression of a print button from the user (S1801: Yes), the controlling unit 405 checks whether the value of the print control information is "No Printing" (S1802). When the printing is possible (S1802: No), it performs printing based on the value of the print control information (S1803). Meanwhile, when the value of the print control information is "No Printing", the controlling unit 405 confirms whether or not access to the site selling the print content on the Internet is possible (that is, whether a function for access to the Internet is provided) (S1804). When the stated access is impossible, it directs the displaying device 40 to display that the printing of the contents specified by the user cannot be performed (for a display example, "No printing" as shown in FIG. 19A) (S1805).

Moreover, the controlling unit 405 verifies whether or not the alternate URL is defined in the DDI (or DDB) (S1806), and when the alternate URL is not defined (S1806), it directs the displaying device 40 to display that the printing cannot be performed as in the stated case (S1807). If the alternate URL is defined (S1806: Yes) and there is a bookmark function (S1808: Yes), the controlling unit 405 registers the alternate URL to the bookmark and directs the displaying device 40 to display so (for example, "URL of the selling site has been registered to the bookmark" as shown in FIG. 19B). If there is not a bookmark function (S1808: No) and an instruction to switch to a communication system screen is received from the user on the screen to confirm whether or not to switch to the communication system screen (a display as shown in FIG. 19C for example) (that is, when ● button is pressed), the controlling unit 405 switches to the communication system screen and performs control to print the contents (S1812). Meanwhile, when the user directs not to switch to the communication system screen (that is, when ▲ button is pressed), the controlling unit 405 instructs the displaying device 40 to display that the printing cannot be performed as in the above case (S1811).

Moreover, when the program ends (S1812: Yes), the controlling unit 405 switches the screen to the bookmark screen and performs control to gain the printed matter under the user's direction (S1814).

FIG. 20 is an example of the bookmark screen. On a bookmark screen 2001 in FIG. 20, a site selling print content 2003 related to the alternate URL registered by the user is displayed and, in this example, the date and time when the alternate URL was registered and a related program title are being displayed when a cursor 2002 is moved to a position of the "selling print content" through an operation by the user.

As described above, using the digital broadcast printing system of the present embodiment, access to the site selling the print content on the network is possible according to the alternate URL even when on-air-content cannot be directly printed out. Thus, printing desired by the user can be realized via the network such as the Internet.

INDUSTRIAL APPLICABILITY

As described above, the print controlling apparatus and the print controlling method of the present invention are useful to a printing system in which a provider side of the broadcast content performs control including whether or not to allow printing of the content. In particular, they are useful to a printing system that allows printing desired by the user to be realized using a network such as the Internet in a case where printing is limited for the digital broadcast.

The invention claimed is:

1. A print controlling apparatus for use with a printing device, said print controlling apparatus comprising:
a receiving unit operable to receive a broadcast signal including (i) print control information and (ii) a content file including content, wherein the print control information identifies a portion of the content to be reduced in resolution;
a print instruction obtaining unit operable to obtain a print instruction which is an instruction to print at least a part of the content; and
an outputting unit operable to instruct the printing device to reduce a resolution of the portion of the content identified to be reduced in resolution by the print control information and operable to instruct the printing device to print the part of the content instructed to be printed by the print instruction including the portion having the reduced resolution when the print instruction is obtained and the print control information satisfies a predetermined condition, and operable to instruct the printing device to create a striped image including a combination of a portion of the content identified to retain an ordinary resolution by the print control information and the portion of the content identified to be reduced in resolution by the print control information.

2. The print controlling apparatus according to claim 1, for use with a displaying device, wherein:
the broadcast signal further includes a content control file including information regarding the content; and
said print controlling apparatus further comprises a display controlling unit operable to output, to the displaying device, an instruction to display the content according to the information regarding the content of the content control file included in the broadcast signal received by said receiving unit.

3. The print controlling apparatus according to claim 1, wherein the print control information is associated with the content file.

4. The print controlling apparatus according to claim 1, wherein:
the broadcast signal further includes picture data; and
the print control information is associated with a program formed by a pair of the content control file and the content file.

5. The print controlling apparatus according to claim 4, wherein:
the content file is a program interlocking content file related to the picture data; and
said print controlling apparatus further comprises a selecting unit operable to select one broadcast signal from a plurality of broadcast signals received by said receiving unit and extract the picture data from the selected broadcast signal, wherein:
said print instruction obtaining unit obtains an instruction to print at least a part of the content file and the picture data; and
the print control information is associated with the picture data.

6. The print controlling apparatus according to claim 1, further comprising the displaying device.

7. The print controlling apparatus according to claim 1, further comprising the printing device and the displaying device.

8. The print controlling apparatus according to claim 7, wherein said outputting unit is operable to instruct the printing device to print the striped image when the print instruction is obtained and the print control information is a predetermined value.

9. The print controlling apparatus according to claim 8, wherein the reduced picture quality is a reduced resolution on a print screen.

10. The print controlling apparatus according to claim 8, wherein the reduced picture quality is achieved by one of superimposing the print screen upon another screen, and a change in color information of the print screen.

11. The print controlling apparatus according to claim 1, further comprising a reading unit operable to read individual print permission information from a storage medium,
wherein said outputting unit is operable to output an instruction to print to the printing device when the print instruction is obtained, the print control information satisfies a first predetermined condition, and the individual print permission information satisfies a second predetermined condition.

12. The print controlling apparatus according to claim 11, further comprising:

a communication controlling unit operable to receive an instruction;

an updating unit operable to update a detail of the individual print permission information in the storage medium according to the instruction received by said communication controlling unit;

a transmit controlling unit operable to externally transmit information; and an instruction obtaining unit operable to obtain a print instruction from a user, wherein said updating unit is operable to update the individual print permission information in the storage medium according to the print instruction.

13. The print controlling apparatus according to claim 1, wherein the print control information is described in the content file.

14. The print controlling apparatus according to claim 13, wherein the content file is described in a BML format.

15. The print controlling apparatus according to claim 13, wherein the content file in which the print control information is described is a top page of the content.

16. The print controlling apparatus according to claim 1, further comprising a display changing unit operable to change a display of an instruction button provided for a user when the print control information satisfies a predetermined condition.

17. The print controlling apparatus according to claim 1, wherein:

the broadcast signal further includes address information indicating an address of a site selling print content on a network; and said print controlling apparatus further comprises a printed matter gaining unit operable to gain a printed matter from the site selling the print content according to the address information when the print instruction is obtained and the print control information indicates that printing is restricted.

18. A method for using a print controlling apparatus with a printing device, said method comprising:

receiving a broadcast signal including (i) print control information and (ii) a content file including content, wherein the print control information identifies a portion of the content to be reduced in resolution;

obtaining a print instruction which is an instruction to print at least a part of the content; and outputting an instruction to the printing device to reduce a resolution of the portion of the content identified to be reduced in resolution by the print control information and outputting an instruction to the printing device to print the part of the content instructed to be printed by the print instruction including the portion having the reduced resolution when the print instruction is obtained and the print control information satisfies a predetermined condition, and instructing the printing device to create a striped image including a combination of a portion of the content identified to retain an ordinary resolution by the print control information and the portion of the content identified to be reduced in resolution by the print control information.

19. The print controlling method according to claim 18, further comprising reading individual print permission information from a storage medium, wherein, said outputting of the instruction to the printing device occurs when the print instruction is obtained, the print control information satisfies a first predetermined condition, and the individual print permission information satisfies a second predetermined condition.

20. The print controlling method according to claim 18, wherein:

the broadcast signal further includes address information indicating an address of a site selling print content on a network; and said print controlling method further comprises gaining a printed matter from the site selling the print content according to the address information when the print instruction is obtained and the print control information indicates that printing is restricted.

21. A program for using a print controlling apparatus with a printing device, said program recorded on a computer-readable recording medium, and said program causing a computer to perform a method comprising:

receiving a broadcast signal including (i) print control information and (ii) a content file including a content, wherein the print control information identifies a portion of the content to be reduced in resolution;

obtaining a print instruction which is an instruction to print at least a part of the content; and outputting an instruction to the printing device to reduce a resolution of the portion of the content identified to be reduced in resolution by the print control information and outputting an instruction to the printing device to print the part of the content instructed to be printed by the print instruction including the portion having the reduced resolution when the print instruction is obtained and the print control information satisfies a predetermined condition, and instructing the printing device to create a striped image including a combination of a portion of the content identified to retain an ordinary resolution by the print control information and the portion of the content identified to be reduced in resolution by the print control information.

22. The program according to claim 21, further causing the computer to perform reading individual print permission information from a storage medium, wherein said outputting of the instruction to the printing device occurs when the print instruction is obtained, the print control information satisfies a first predetermined condition, and the individual print permission information satisfies a second predetermined condition.

23. The program according to claim 21, wherein:

the broadcast signal further includes address information indicating an address of a site selling print content on a network; and said program further causes the computer to perform gaining a printed matter from the site selling the print content according to the address information when the print instruction is obtained and the print control information indicates that printing is restricted.

24. The print controlling apparatus according to claim 2, wherein the print control information is associated with the content file.

25. The print controlling apparatus according to claim 2, wherein:

the broadcast signal further includes picture data; and the print control information is associated with a program formed by a pair of the content control file and the content file.

26. The print controlling apparatus according to claim 2, further comprising the displaying device.

27. The print controlling apparatus according to claim 2, further comprising the printing device and the displaying device.

28. The print controlling apparatus according to claim 2, wherein the print control information is described in the content file.

* * * * *